US011005782B2

(12) United States Patent
Iyer et al.

(10) Patent No.: US 11,005,782 B2
(45) Date of Patent: May 11, 2021

(54) MULTI-ENDPOINT ADAPTER/MULTI-PROCESSOR PACKET ROUTING SYSTEM

(71) Applicant: Dell Products L.P., Round Rock, TX (US)

(72) Inventors: Shyamkumar T. Iyer, Austin, TX (US); Hendrich M. Hernandez, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/396,453

(22) Filed: Apr. 26, 2019

(65) Prior Publication Data
US 2020/0344179 A1 Oct. 29, 2020

(51) Int. Cl.
*H04L 12/931* (2013.01)
*H04L 12/935* (2013.01)

(52) U.S. Cl.
CPC ........ *H04L 49/205* (2013.01); *H04L 49/3009* (2013.01); *H04L 49/3054* (2013.01); *H04L 49/354* (2013.01)

(58) Field of Classification Search
CPC ..... H04L 49/20; H04L 49/205; H04L 49/206; H04L 49/25; H04L 49/253; H04L 49/254; H04L 49/30; H04L 49/3009; H04L 49/3054; H04L 49/35; H04L 49/354; H04L 49/602; H04L 49/70; H04L 12/4633;
(Continued)

(56) References Cited

U.S. PATENT DOCUMENTS

| 7,558,273 B1* | 7/2009 | Grosser, Jr. ......... H04L 12/4645 370/389 |
| 9,264,383 B1 | 2/2016 | Dropps |
| 10,602,383 B1* | 3/2020 | Horton .................. H04W 24/08 |

(Continued)

FOREIGN PATENT DOCUMENTS

WO WO2015141014 9/2015

OTHER PUBLICATIONS

Jun Huang, Yunlong He, Qiang Duan, Ding Yang and Wei Wang, "Admission control with flow aggregation for QoS provisioning in software-defined network," 2019, 1 Page, IEEE XPLORE Digital Library, IEEE, https://ieeexplore.ieee.org/document/7036969.

*Primary Examiner* — Peter Chen
(74) *Attorney, Agent, or Firm* — Haynes and Boone, LLP

(57) ABSTRACT

A multi-endpoint adapter includes endpoints configured to couple to respective processing subsystems, multi-endpoint adapter ports configured to couple to an external switch via respective external switch ports, and an internal switch coupled to the endpoints and multi-endpoint adapter ports. The internal switch receives a data packet from a first application provided by a first processing subsystem through a first endpoint, and matches the data packet to a data flow associated with QoS parameter(s). The internal switch then identifies a data flow action that is associated with the data flow and that provides for the transmission of the data packet via a first multiple endpoint adapter port that is configured in a manner that satisfies the at least one QoS parameter, and performs the data flow action to transmit the data packet through the first multi-endpoint adapter port and a first external switch port to the external switch.

20 Claims, 12 Drawing Sheets

(58) Field of Classification Search
CPC ......... H04L 45/00; H04L 45/38; H04L 45/42;
H04L 45/66
See application file for complete search history.

(56) References Cited

U.S. PATENT DOCUMENTS

| | | | |
|---|---|---|---|
| 2015/0026313 A1* | 1/2015 | Chawla | H04L 41/5035 709/220 |
| 2015/0156124 A1* | 6/2015 | Tsuji | H04L 47/6275 370/230 |
| 2017/0302529 A1* | 10/2017 | Agarwal | H04L 69/12 |

* cited by examiner

MULTI-ENDPOINT ADAPTER/MULTI-PROCESSOR PACKET ROUTING SYSTEM

BACKGROUND

The present disclosure relates generally to information handling systems, and more particularly to routing packets via a multi-endpoint adapter device coupled to multiple processing subsystems in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, server devices, include multiple processors and utilize a Non-Uniform Memory Access (NUMA) computer memory design in which each processor is provided a local memory that it can access quickly, with those processors coupled together via processor interconnect(s) (e.g., Ultra-Path Interconnects (UPIs) available in processing systems provided by INTEL® Corporation of Santa Clara, Calif., United States) that allow the processors to access the memory that is local to the other processors. Furthermore, such server devices may be provided with multi-endpoint adapter devices that provide a plurality of endpoints (e.g., PCIe endpoints), and in a specific example the endpoints may include software-defined Network Interface Controllers (NICs). When each of the endpoints is connected to a respective processor by a dedicated link (e.g., a PCIe bus), it becomes desirable to prevent applications (e.g., provided by each respective processor executing application code stored in its respective local memory) from sending data packets over the processor interconnect(s), as doing so introduces latency in the transmission of those data packets and can use up the bandwidth of the processor interconnect(s) and prevent or limit the intended use of those processor interconnect(s) for direct memory accesses by the processors accessing memory that is local to another processor.

Multi-endpoint adapter devices have been developed that prevent data packets generated by the applications discussed above from being transmitted over the processor interconnects, including those described in U.S. patent Ser. No. 15/872,100, filed on Jan. 16, 2018, the disclosure of which is incorporated by reference herein in its entirety. However, such multi-endpoint adapter do not take into account Quality of Service (QoS) considerations for data packets routed from applications to an external switch such as, for example, a Top Of Rack (TOR) switch. For example, many application are provided according to Service Level Agreements (SLAs) that guarantee a minimum bandwidth and/or maximum latency associated with their data packet transmissions, and while the multi-endpoint adapter devices discussed above reduce latency by preventing the use of the processor interconnects to transmit data packets from the applications to the external switch, they provide no control over the NICs and therefore cannot route data packets in a manner that can guarantee QoS requirements provided for those applications.

Accordingly, it would be desirable to provide an improved multi-endpoint adapter/multi-processor packet routing system.

SUMMARY

According to one embodiment, an Information Handling System (IHS) includes a plurality of memory subsystems; a respective processing subsystem coupled to each of the plurality of memory subsystems, wherein each respective processing subsystem is configured to execute instructions that are included on the respective memory subsystem to which it is coupled in order to provide a respective application; and a multi-endpoint adapter device that is coupled to each of the respective processing subsystems, wherein the multi-endpoint adapter device includes: a respective endpoint device coupled to each respective processing subsystem; a plurality of multi-endpoint adapter device ports that are coupled to respective external switch device ports on an external switch device; and an internal switch device that is coupled to each of the respective endpoint devices and each of the plurality of multi-endpoint adapter device ports, wherein the internal switch device is configured to: receive, from a first application provided by a first processing subsystem and through a first endpoint device, a data packet; match the data packet to a data flow that is identified in an internal switch device database and that is associated with at least one Quality of Service (QoS) parameter; identify a data flow action that is associated with the data flow in the internal switch device database and that provides for the transmission of the data packet via a first multi-endpoint adapter device port that is included in the plurality of multi-endpoint adapter device ports and that is configured in a manner that satisfies the at least one QoS parameter; and perform the data flow action to transmit the data packet through the first multi-endpoint adapter device port to the external switch device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
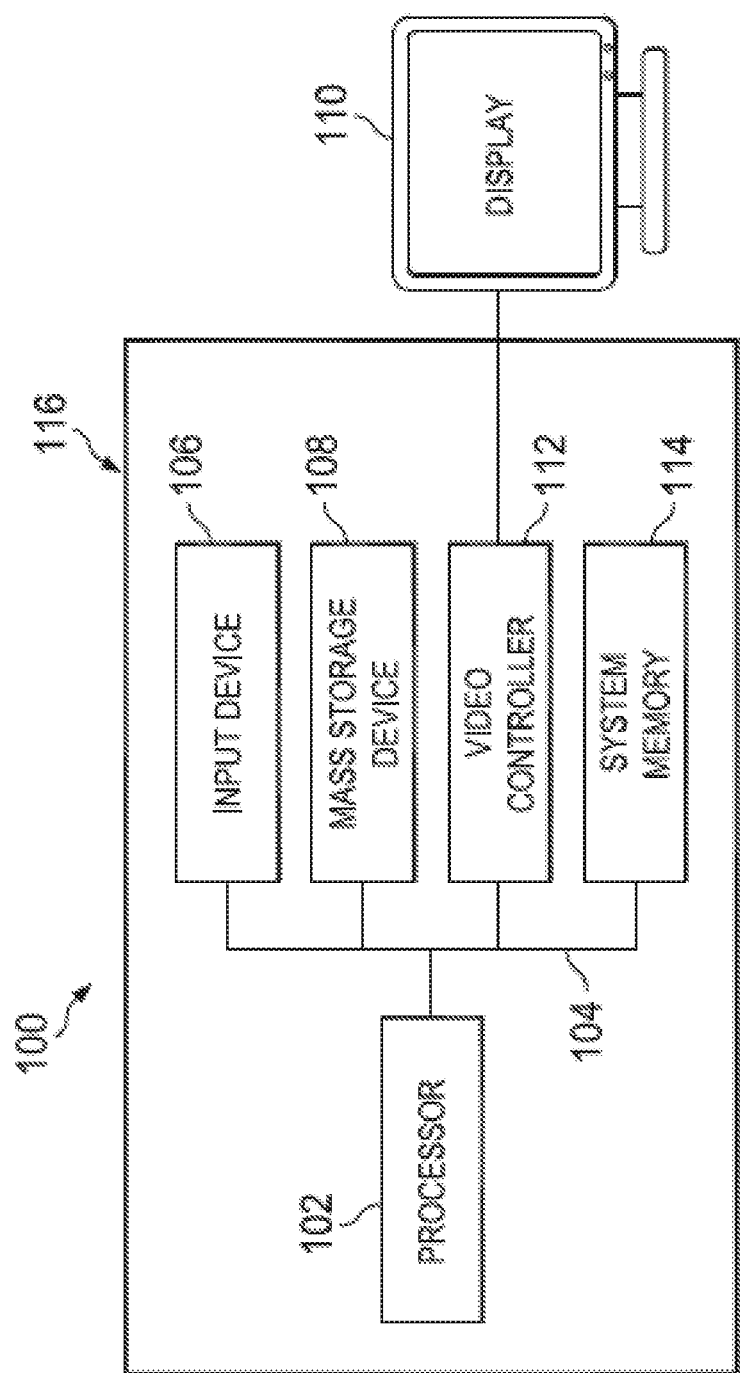
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
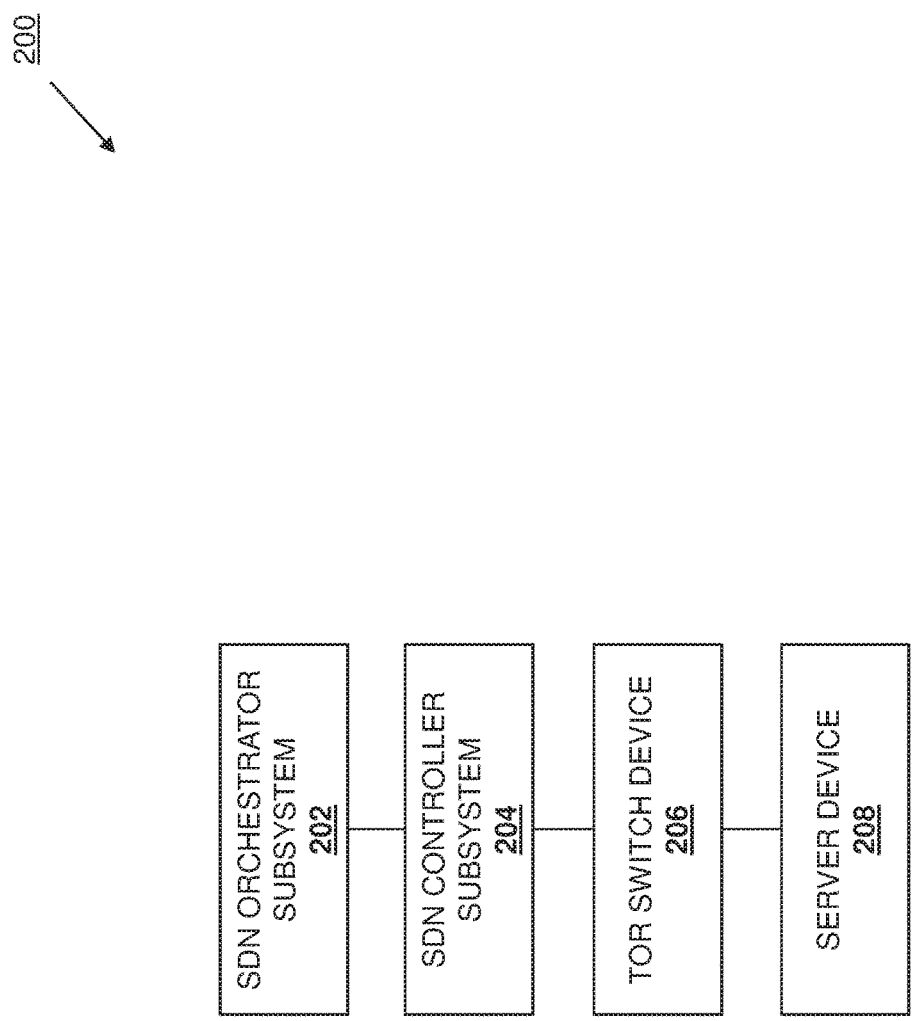
FIG. 2 is a schematic view illustrating an embodiment of a networked system including an embodiment of the multi-endpoint adapter/multi-processor packet routing system of the present disclosure.

Referring now to FIG. 2, an embodiment of a networked system 200 is illustrated that provides an embodiment of the multi-endpoint adapter/multi-processor packet routing system of the present disclosure. In the illustrated embodiment, the system 200 includes a Software Defined Networking (SDN) orchestrator subsystem 202 that is coupled through an SDN controller subsystem 204 to an external switch device such as, for example, the Top Of Rack (TOR) switch device 206 illustrated in FIG. 2. In some embodiments, the SDN orchestrator subsystem 202 and the SDN controller subsystem 204 may be provided as part of the TOR switch device 206 via, for example, applications provided in, and/or hardware included in, the TOR switch device 206. However, in other embodiments the SDN orchestrator subsystem 202 and/or the SDN controller subsystem 204 may be provided in device(s) that are separate from the TOR switch device 206 (or other external switch device) while remaining within the scope of the present disclosure as well.

As would be understood by one of skill in the art in possession of the present disclosure, SDN orchestrator subsystems may be provided by software and/or hardware that operates via a management plane to provide life-cycle management for an SDN network, as well as perform other SDN orchestration functionality known in the art, while SDN controller subsystems may be provided by software and/or hardware that operates via a control plane to implement control plane functionality for an SDN network, as well as perform other SDN controller functionality known in the art. The TOR switch device 206 and/or any device(s) providing the SDN orchestrator subsystem 202 and the SDN controller subsystem 204 may be provided by the IHS 100 discussed above with reference to FIG. 1, and/or may include some or all of the components of the IHS 100. However, while illustrated and discussed as a TOR switch device 206, one of skill in the art in possession of the present disclosure will recognize that the devices included in the networked system 200 to provide the multi-endpoint adapter/multi-processor packet routing system of the present disclosure may include any devices that may be configured to operate similarly as discussed below.

As illustrated, the TOR switch device 206 is coupled to a server device 208 that includes the multiple processor subsystems and multi-endpoint adapter device of the present disclosure, which as discussed below provide for the multi-endpoint adapter/multi-processor packet routing functionality described herein. The server device 208 may be provided by the IHS 100 discussed above with reference to FIG. 1, and/or may include some or all of the components of the IHS 100. While a single external switch device (referred to as "external" because, in this example, the TOR switch device 206 is external to the server device 208) and a single server device are illustrated, one of skill in the art in possession of the present disclosure will recognize that many more external switch devices and server devices may (and typically will) be coupled together and provided in the networked system 200 (e.g., a datacenter) while remaining within the scope of the present disclosure. While a specific networked system 200 has been illustrated and described, one of skill in the art in possession of the present disclosure will recognize that the networked system of the present disclosure may include a variety of components and/or component configurations while remaining within the scope of the present disclosure as well.

Figure 3:
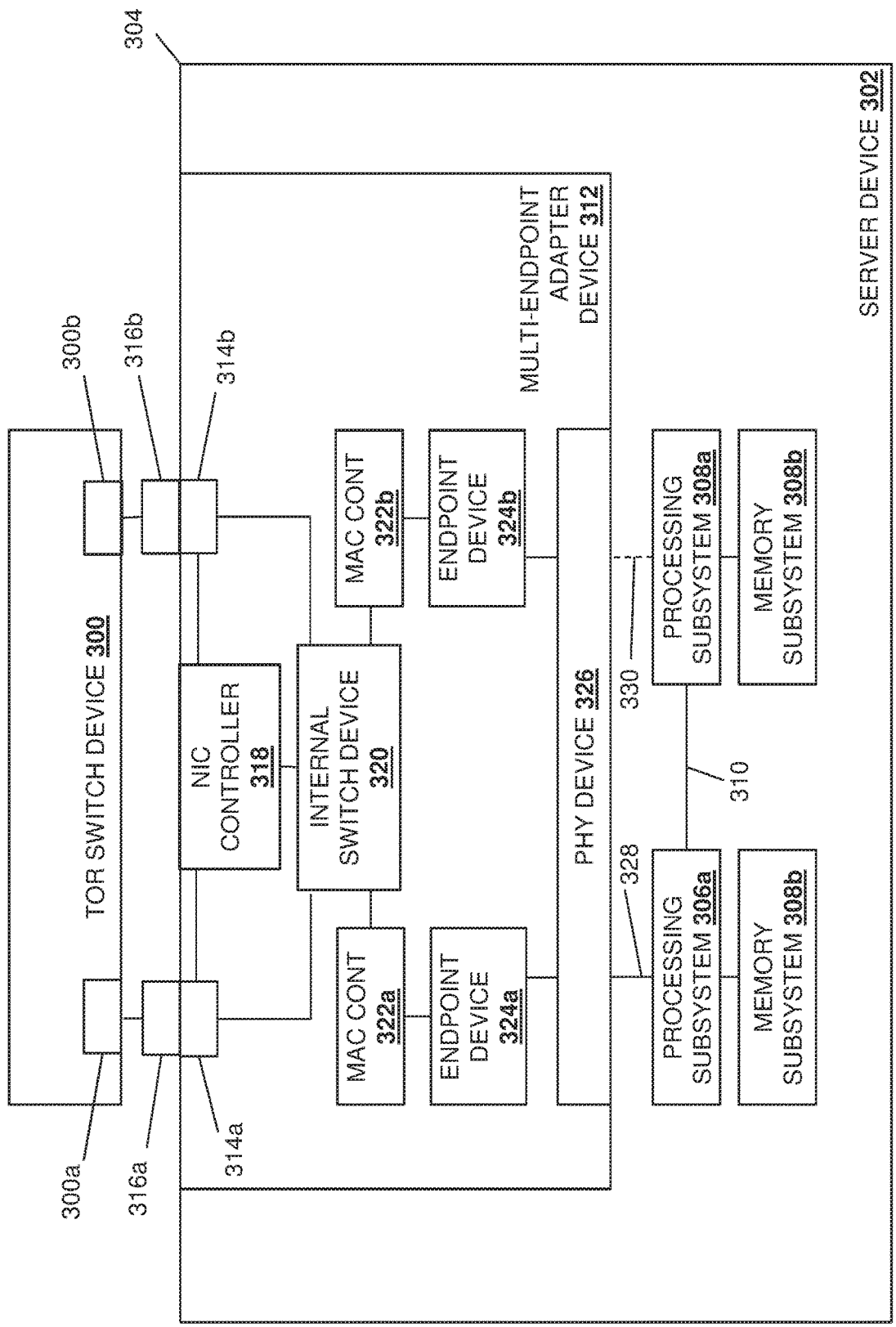
FIG. 3 is a schematic view illustrating an embodiment of a switch device and a server device that may be provided in the networked system of FIG. 2.

Referring now to FIG. 3, an embodiment of the multi-endpoint adapter/multi-processor packet routing system of the present disclosure is illustrated as provided by a TOR switch device 300 (which may be the TOR switch device 206 discussed above with reference to FIG. 2) coupled to a server device 302 (which may be the server device 208 discussed above with reference to FIG. 2.) As such, the TOR switch device 300 may be provided by the IHS 100 discussed above with reference to FIG. 1 and/or may include some or all of the components of the IHS 100, and as discussed above may be considered as an "external" switch device from the point of view of the server device 302. In the illustrated embodiment, the TOR switch device 300 includes a plurality of TOR switch device ports 300a and 300b (i.e., external switch device ports) that, as discussed below, are configured to couple the TOR switch device 300 to the server device 302. Furthermore, while illustrated and discussed as a TOR device 300, one of skill in the art in possession of the present disclosure will recognize that the functionality of the TOR switch device 300 discussed below may be provided by other devices that are configured to operate similarly as discussed below.

The server device 302 may also be provided by the IHS 100 discussed above with reference to FIG. 1 and/or may include some or all of the components of the IHS 100. Furthermore, while illustrated and discussed as a server device 302, one of skill in the art in possession of the present disclosure will recognize that the functionality of the server device 302 discussed below may be provided by other devices that are configured to operate similarly as discussed below. In the illustrated embodiment, the server device 302 includes a chassis 304 that houses the components of the server device 300, only some of which are illustrated below. For example, the chassis 304 may house a processing system that, in the illustrated embodiment, includes a plurality of processing subsystems 306a and 308a (which may each include one or more of the processor 102 discussed above with reference to FIG. 1) that are coupled together by a processor interconnect 310 such as, for example, an Ultra-Path Interconnect (UPI) available in processing systems provided by INTEL® Corporation of Santa Clara, Calif., United States.

In the illustrated embodiment, each of the processing subsystems 306a and 308a are provided with and connected to respective memory subsystems 306b and 308b. For example, the processing subsystems and memory subsystems in the server device 300 may utilize a Non-Uniform Memory Access (NUMA) computer memory design in which each respective processing subsystem is connected a respective local memory subsystem to provide a respective NUMA node (i.e., the processing subsystem 306a and its local memory subsystem 306b provide a first NUMA node, and the processing subsystem 308a and its local memory subsystem 308b provide a second NUMA node.) However, while two processing subsystems/memory subsystems (e.g., two NUMA nodes) are illustrated in FIG. 3, one of skill in the art in possession of the present disclosure will recognize that additional processing subsystems/memory subsystems (e.g., NUMA nodes) may be provided according to the teachings of the present disclosure will falling within its scope as well The chassis 302 may also house a multi-endpoint adapter device 312 that may provide, for example, the Network Interface Controller (NIC) functionality discussed below, although one of skill in the art in possession of the present disclosure will recognize that other multi-endpoint adapter device functionality will fall within the scope of the present disclosure as well. In the illustrated embodiment, the multi-endpoint adapter device 312 includes a plurality of multi-endpoint adapter device ports 314a and 314b that may be provided by, for example, Ethernet ports that are configured to couple the multi-endpoint adapter device 312 (and thus the server device 302 in which it is provided) to the TOR switch device 300. In the illustrated embodiment, a plurality of transceivers 316a and 316b (e.g., Quad Small Form-factor Pluggable (QSFP) transceivers) are connected to each of the multi-endpoint adapter device ports 314a and 314b, respectively, and are also coupled to the TOR switch device ports 300a and 300b, respectively, in order to couple the multi-endpoint adapter device 312/server device 302 to the TOR switch device 300. However, while a specific coupling configuration with transceivers is illustrated and described, one of skill in the art in possession of the present disclosure will recognize that the multi-endpoint adapter device 312/server device 302 may be coupled to the TOR switch device 300/external switch device in a variety of manners that will fall within the scope of the present disclosure as well.

In the illustrated embodiment, the multi-endpoint adapter device 312 includes a NIC controller 318 that is coupled to each of the multi-endpoint adapter device ports 314a and 314b and that, as discussed below, may be provided by a "smart" NIC controller that is capable of configuring (or providing for the configuration of) subsystems on the multi-endpoint adapter device 312. In the illustrated embodiment, the multi-endpoint adapter device 312 also includes internal switch device 320 that is coupled to each of the multi-endpoint adapter device ports 314a and 314b and to the NIC controller 318. As discussed below, the multi-endpoint adapter device 312 may be configured by the NIC controller 318 to perform the data packet routing discussed below. In the illustrated embodiment, the multi-endpoint adapter device 312 also includes a plurality of Media Access Control (MAC) controllers 322a and 322b that are coupled to the internal switch device 320 and that may include, for example, hardware that provides for the implementation of the MAC sublayer in the data link layer that provides for addressing and channel access control mechanisms. In the illustrated embodiment, the multi-endpoint adapter device 312 also includes a plurality of endpoint devices 324a and 324b that are coupled to the MAC controllers 322a and 322b, respectively, and that may each be provided by, for example, physical or virtual Peripheral Component Interconnect express (PCIe) devices, although one of skill in the art in possession of the present disclosure will recognize that other types of endpoint devices may fall within the scope of the present disclosure as well.

Each of the endpoint devices 324a and 324b are coupled to a physical layer (PHY) device 326 that may be provided with (or as part of) a connector (not illustrated, but which may be provided by a PCIe connector) on the multi-endpoint adapter device 312. The PHY device 326 is configured to connect to a board (e.g., a motherboard) in the chassis 304 (e.g., via a riser device), which may provide for one or more connections to the processing subsystems 306a/306b and memory subsystems 308a and 308b in order to couple the multi-endpoint adapter device 312 to the processing subsystems 306a and 306b (e.g., via a PCIe bus provided on the board and PCIe root ports included in the processing subsystems 306a and 306b). In some embodiments, the coupling of the multi-endpoint adapter device 312 to the processing subsystems 306a and 306b may include a single connection 328 between the processing subsystem 306a and the PHY device 326. However, in some embodiments, the coupling of the multi-endpoint adapter device 312 to the processing subsystems 306a and 306b may also include a dedicated connection 330 (illustrated in dashed lines in FIG. 3 to indicate that that it is optional in some embodiments) between the processing subsystem 308a and the PHY device 326. While a specific server device 302 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
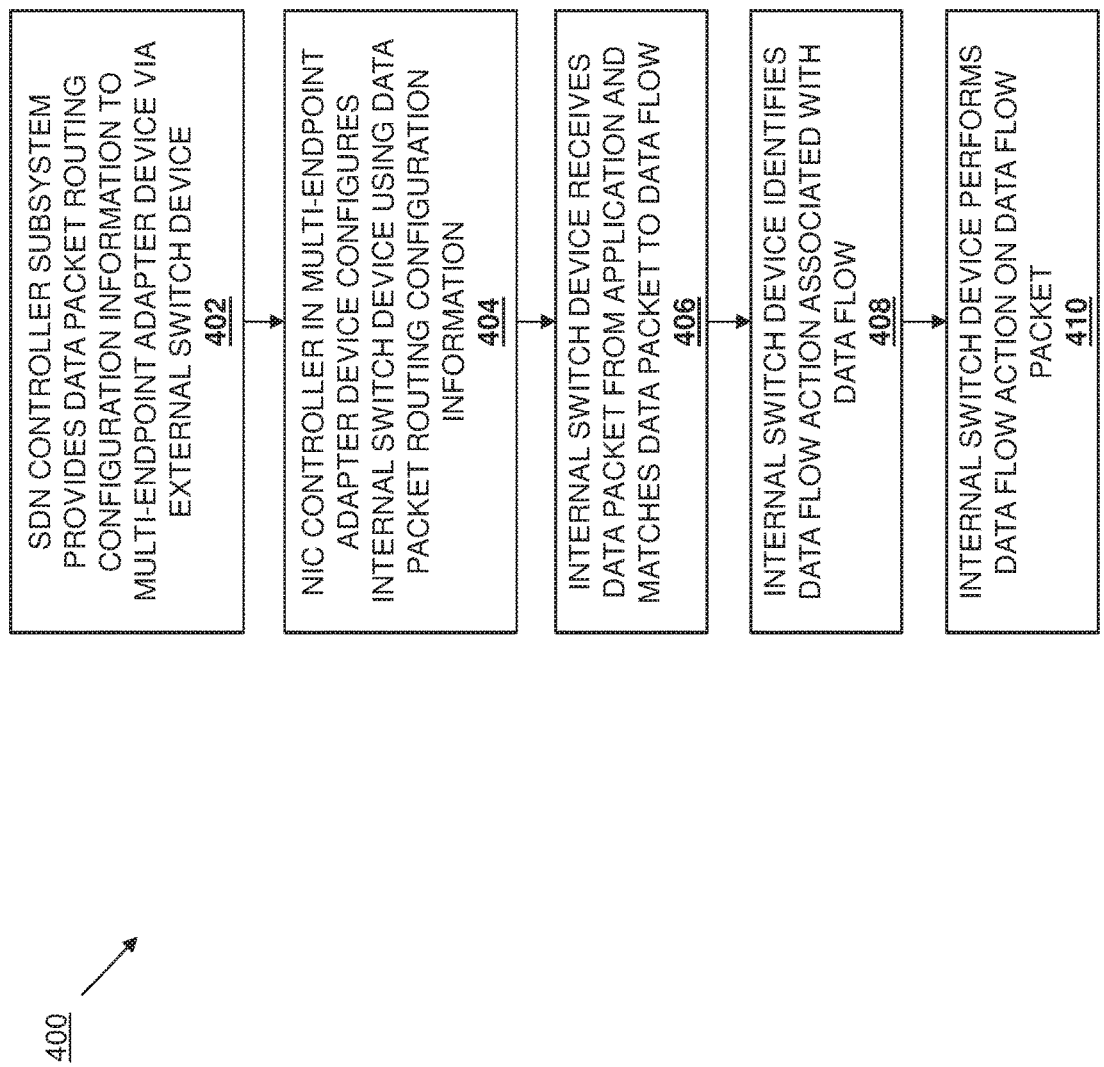
FIG. 4 is a flow chart illustrating an embodiment of a method for routing packets in a multi-endpoint adapter/multi-processor system.

Referring now to FIG. 4, an embodiment of a method for routing packets in a multi-endpoint adapter/multi-processor system is illustrated. As discussed below, the systems and methods of the present disclosure provide for the configuration of a multi-endpoint adapter device to provide for the transmission of data packets via the multi-endpoint adapter device in a manner that ensures a Quality of Service (QoS) guaranteed to an application that provided those data packets. For example, Software Defined Networking (SDN) control subsystems (e.g.; an orchestrator and a controller) may be provided with data packet routing configurations that may be based on QoS guarantees for applications that are provided by processing subsystems in the server device that includes the multi-endpoint adapter device. The SDN control systems may transmit the data packet routing configurations via an external switch device, such as a TOR switch, to the multi-endpoint adapter device in the server device, where they are received by a MC controller included on the multi-endpoint adapter device. The NIC controller uses the data packet routing configurations to configure an internal switch device included on the multi-endpoint adapter device, which may include providing data flow match information and data flow action information for storage in an internal switch device database that is accessible to the internal switch device, programming a flow database that is accessible to the internal switch device with information for forwarding data packets, causing the internal switch device to negotiate port speeds for multi-endpoint adapter device ports on the multi-endpoint adapter device that are coupled to the external switch device, and/or performing a variety of other configuration operations that would be apparent to one of skill in the art in possession of the present disclosure.

Subsequently, when the internal switch device receives data packets from applications provided by the processing subsystems in the server device; it uses the data flow matching information to match those data packets to particular data flows, and uses the data flow action information to determine data flow actions that are associated with those data flows and that provide for the transmission of their associated data packets in a manner that satisfies the QoS guarantees for the applications that generated them. The internal switch device may then transmit each data packet it received according to the data flow action identified for the data flow that matches that data packet, which ensures that each data packet generated by an application provided by a processing subsystem in the server device will be transmitted from the server device to the external switch device via the multi-endpoint adapter device ports on the multi-endpoint adapter device that are configured to satisfy the QoS guarantee associated with the application that generated that data packet. As such, the teachings of the present disclosure provide data packet transmission systems that may save power by ensuring that data packets are not transmitted at higher speeds than are required, conserve external switch device processing, frequency, and, load resources, work around "noisy neighbor" applications that attempt to utilize data transmission resources they do not require, and/or provide a variety of other benefits that would be apparent to one of skill in the art in possession of the present disclosure.

The method 400 begins at block 402 where an SDN controller subsystem provides data packet routing configuration information to a multi-endpoint adapter device via an external switch device. In an embodiment, at or before block 402, the SDN orchestrator subsystem 202 may receive application Quality of Service (QoS) information. For example, the SDN orchestrator subsystem 202 may provide an QoS provisioning application that is accessible to an administrator or other user, and may provide (e.g., via a graphical user interface displayed on a display device) for the input of QoS information that, in the examples below, define how data packets generated by particular applications should be transmitted by a multi-endpoint adapter device in order to satisfy QoS guarantees provided for those applications. For example, the SDN orchestration subsystem 202 may allow for the provisioning of an application identifier that identifies an application, as well one or more QoS parameters that define the QoS guaranteed for the provisioning of that application by a server device. However, while described as being provided by an administrator or other user, the QoS information provided by the SDN orchestration subsystem 202 to the SDN controller subsystem 204 as discussed below may be received by the SDN orchestration subsystem in other manners, may be dynamically determined by the SDN orchestration subsystem, and/or may be generated in any of a variety of manners that would be apparent to one of skill in the art in possession of the present disclosure.

In the specific examples discussed below, the QoS parameters define a first QoS for an application 600 that is provided by the processing subsystem 306a (e.g., via the execution of application code included in the memory subsystem 306b), and a second QoS for an application 602 that is provided by the processing subsystem 308a (e.g., via the execution of application code included in the memory subsystem 308b), with those the QoS configured to guarantee a minimum data packet transmission bandwidth (e.g., 10 Gbps, 25 Gbps, and 10+25 Gbps in the examples below). However, in other embodiments the QoS guarantees may provide for a maximum latency. Furthermore, in some embodiments, other QoS parameters may not be related to data transmission while remaining within the scope of the present disclosure as well.

Figure 5:
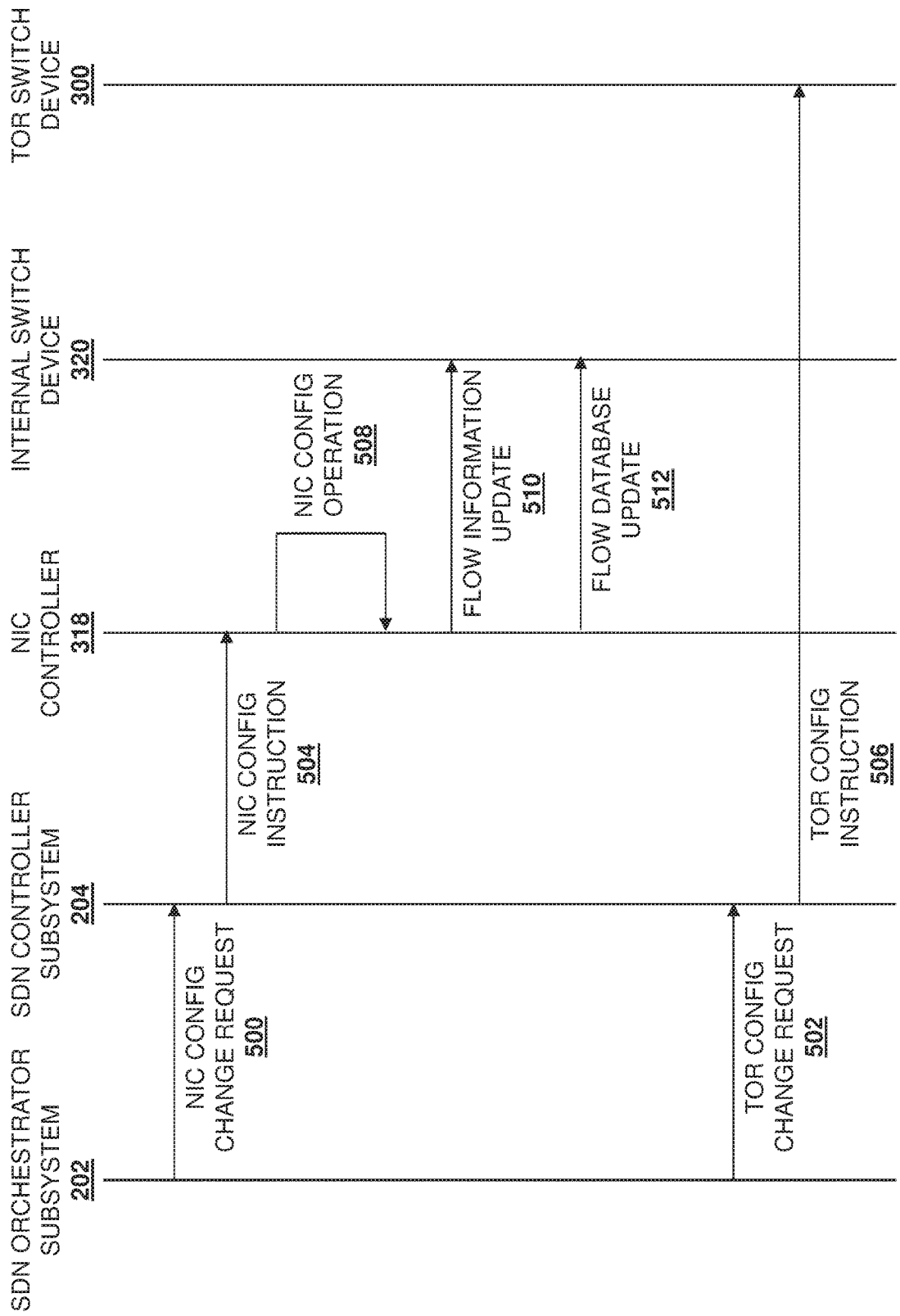
FIG. 5 is a swim lane diagram illustrated an embodiment of the configuration of the multi-endpoint adapter/multi-processor system provided by the switch device and the server device of FIG. 3 during the method of FIG. 4.

As such, at or prior to block 402, the SDN orchestration subsystem 202 may provide the QoS information to the SDN controller subsystem 204 (e.g., via a "north-south" Application Programming Interface (API)). With reference to FIG. 5, the SDN orchestrator subsystem 202 is illustrated as providing the QoS information to the SDN controller subsystem 204 in a MC configuration change request 500. In addition, FIG. 5 illustrates how the SDN orchestrator subsystem 202 may provide a TOR configuration change request 502 to the SON controller subsystem 204, which may operate to request a configuration of the TOR switch device 300 in a manner that provides for the satisfaction of the QoS guarantees discussed above. For example, the configuration request for the TOR switch device 300 may request the configuration of speed settings on one or more ports on the TOR switch device 300, Maximum Transmission Unit (MTU) settings, Virtual Local Area Network (ULAN) settings, optimal payload fragmentation settings, payload buffering configurations, and/or other TOR switch device settings that would be apparent to one of skill in the art in possession of the present disclosure. Furthermore, the configuration request for the TOR switch device 300 may request the configuration of same flow marching configurations that may be applied on the TOR switch device 300 to identify flows when forwarding those flows to other switch devices and preserving end-to-end QoS guarantees.

The SDN controller subsystem 204 may then operate to utilize the QoS information to generate data packet routing configuration information that, as discussed below, may provide for data packet/data flow matching, data flow actions that are associated with data flows from particular applications and that operate to ensure QoS parameters for those particular applications, flow database programming that is configured to enable data packet routing, and/or any other data packet routing configuration functionality that would be apparent to one of skill in the art in possession of the present disclosure as providing for the functionality discussed below. However, while the SON controller subsystem 204 is describes as converting QoS information received from an SON orchestration subsystem into data packet routing configuration information, one of skill in the art in possession of the present disclosure will recognize that the SON controller subsystem 204 may receive the data packet routing configuration information directly, generate the data packet routing configuration information in manners other than via QoS information received from an SON orchestration subsystem, and/or provide the data packet routing configuration information in a variety of manners that will fall within the scope of the present disclosure as well.

Figure 6A:
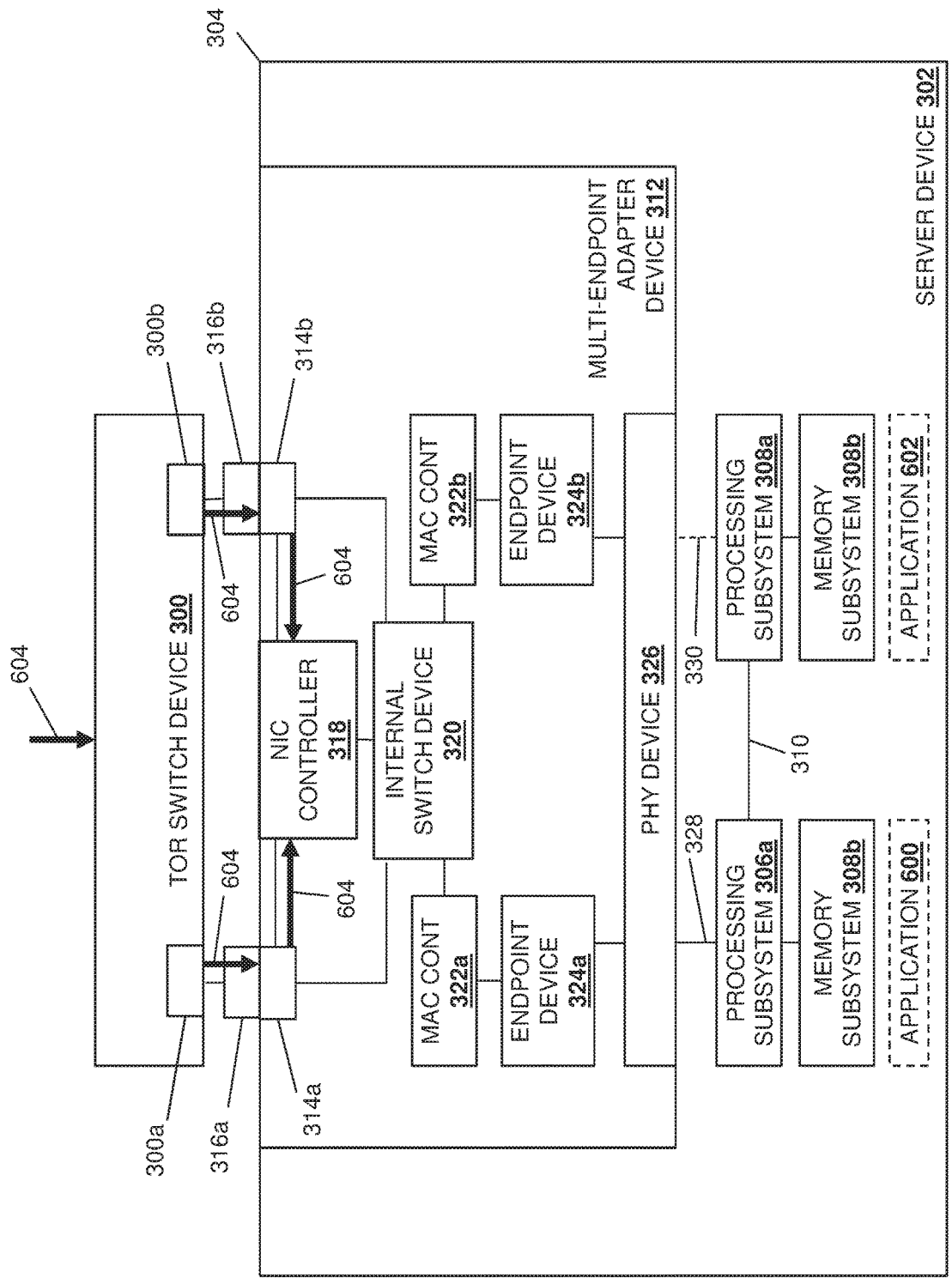
FIG. 6A is a schematic view illustrating an embodiment of configuration operations of the multi-endpoint adapter/multi-processor system provided by the switch device and the server device of FIG. 3 during the method of FIG. 4.

In an embodiment, at block 402, the SDN controller subsystem 204 may operate to transmit the data packet routing configuration information through the TOR switch device 206/300 to the server device 208/302. For example, at block 402, the SDN controller subsystem 204 may provide the data packet routing configuration information in a Type-Length-Value (TLV) format of OPENFLOW control packet(s) (e.g., openflow-set-configuration command(s)), which may be provided according to the OPENFLOW communications protocol, although the transmission of the data packet routing configuration information via other communication protocols and/or other techniques will fall within the scope of the present disclosure as well. FIG. 6A illustrates how the TOR switch device 300 may receive data packet routing configuration information 604, and provide that data packet routing configuration information 604 to the NIC controller 318 via either or both of the external switch device ports 300a, either or both of the transceivers 316a and 316b, and either or both of the multi-endpoint adapter device ports 314a and 314b. With reference to FIG. 5, the SDN controller subsystem 204 is illustrated as providing the data packet routing configuration information to the NIC controller 318 in a NIC configuration instruction 504. In addition, FIG. 5 illustrates how the SDN controller subsystem 204 may provide a TOR configuration instruction 506 to the NIC controller 318, which may operate to configure the TOR switch device 300 in any manner that provides for the satisfaction of the QoS guarantees discussed above. Continuing with the example provided above, the configuration of the TOR switch device 300 may include the configuration of speed settings on one or more ports on the TOR switch device 300, Maximum Transmission Unit (MTU) settings, Virtual Local Area Network (ULAN) settings, optimal payload fragmentation settings, payload buffering configurations, and/or other TOR switch device settings that would be apparent to one of skill in the art in possession of the present disclosure. Furthermore, the configuration of the TOR switch device 300 may include the configuration of same flow marching configurations for the TOR switch device 300 that identify flows when forwarding those flows to other switch devices and preserving end-to-end QoS guarantees.

Figure 6B:
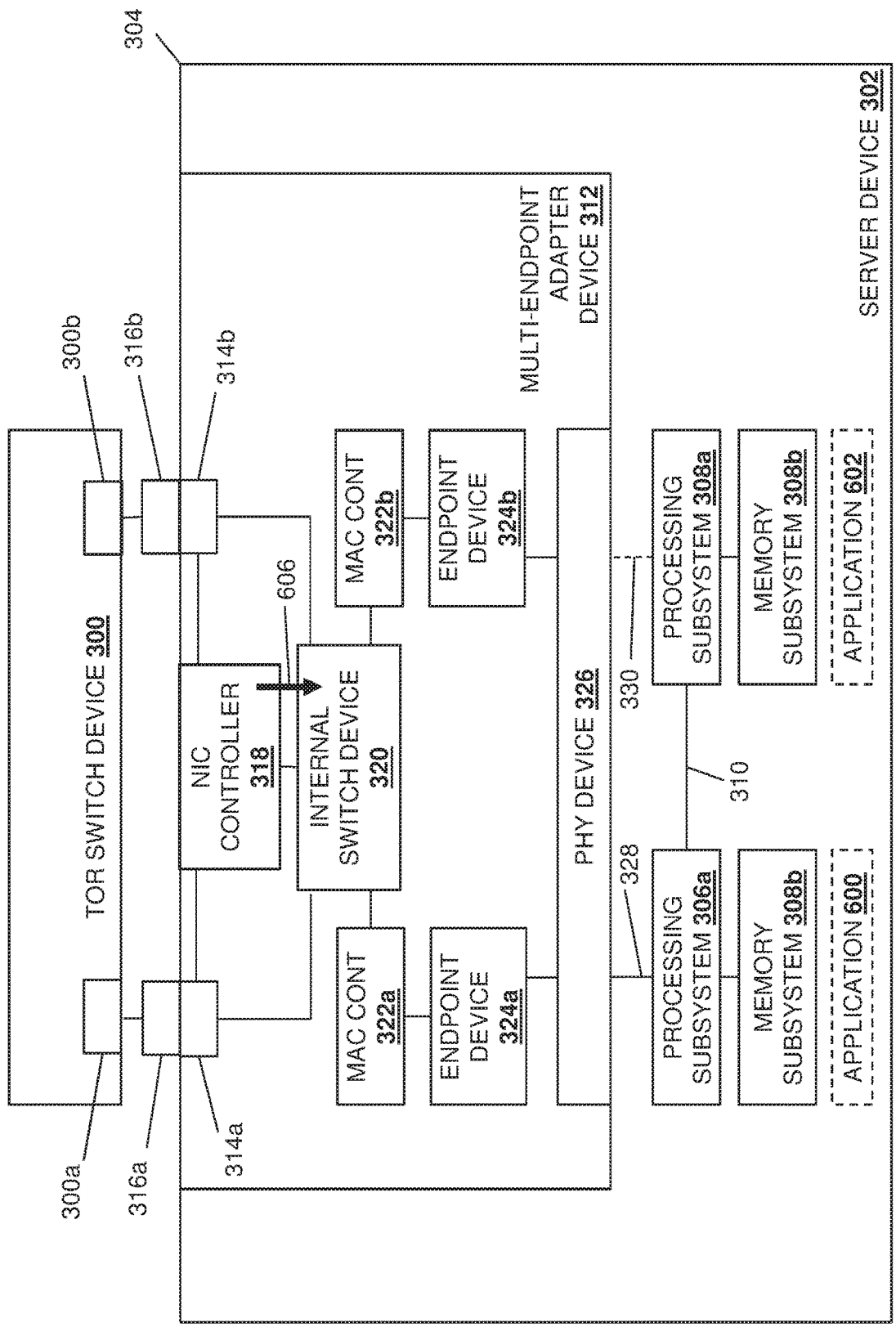
FIG. 6B is a schematic view illustrating an embodiment of the configuration operations of the multi-endpoint adapter/multi-processor system provided by the switch device and the server device of FIG. 3 during the method of FIG. 4.
Figure 6C:
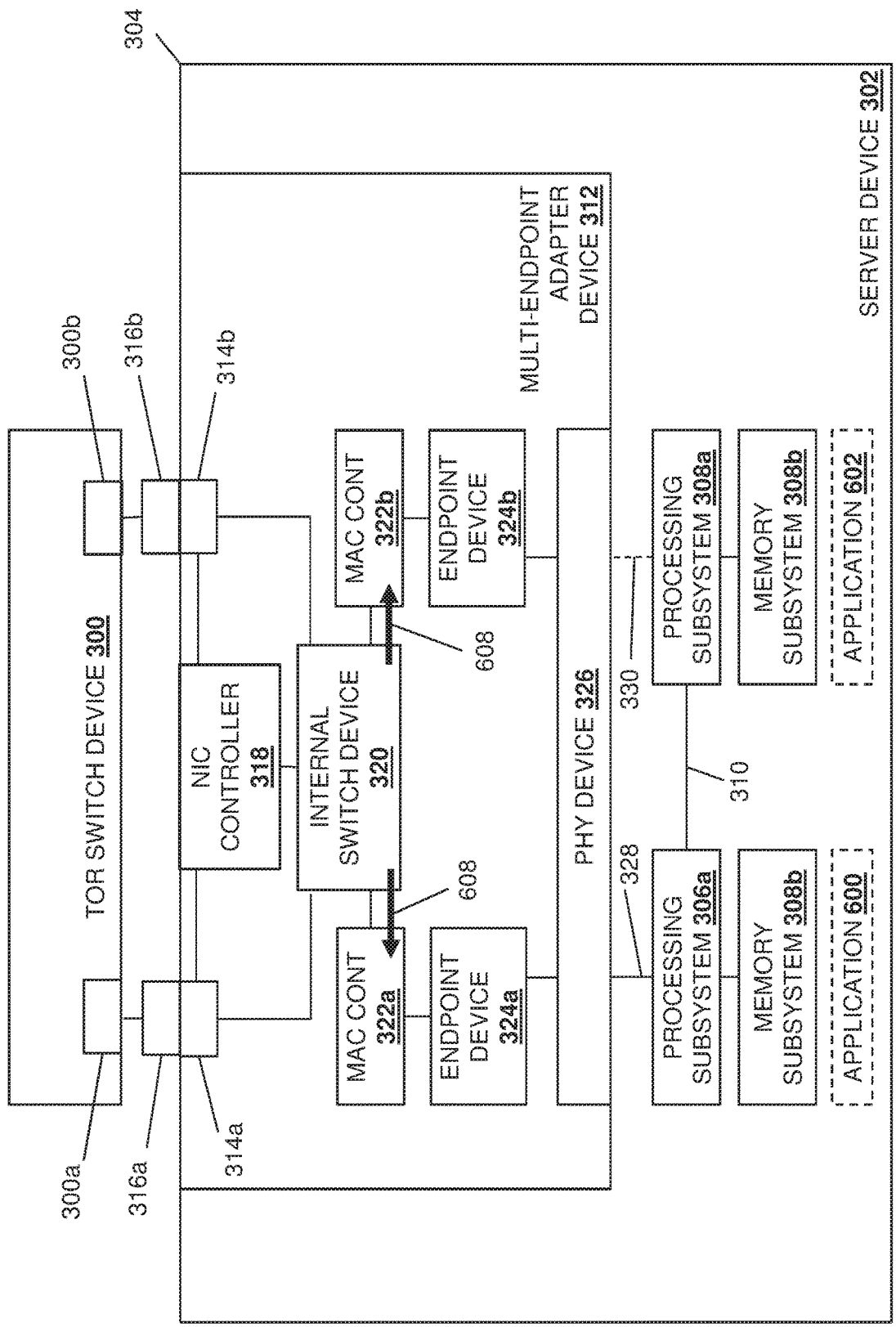
FIG. 6C is a schematic view illustrating an embodiment of the configuration operations of the multi-endpoint adapter/multi-processor system provided by the switch device and the server device of FIG. 3 during the method of FIG. 4.

The method 400 then proceeds to block 404 where a NIC controller in the multi-endpoint adapter device configures an internal switch device using the data packet routing configuration information. In an embodiment, at block 404, the NIC controller 318 may operate to configure the internal switch device 320 using the data packet routing configuration information received at block 402. As discussed in further detail below, the configuration of the internal switch device 320 at block 404 may involve a variety of information being provided to and/or stored in a database included in and/or accessible to the internal switch device 320, a variety of configuration operations being performed on the internal switch device 302, a variety of other operations that may cause the internal switch device to perform configuration actions on other subsystems, and/or any other configuration action that would be apparent to one of skill in the art in possession of the present disclosure. As such, FIG. 6B illustrates the NIC controller 318 performing configuration operations 606 on the internal switch device 320, and FIG. 6C illustrates an example in which the configuration operations 606 cause the internal switch device 320 to perform configuration operations 608 on either or both of the MAC controllers 322a and 322b.

For example, at block 404 and as illustrated in FIG. 5, the NIC controller 318 may utilize the data packet routing configuration information to perform NIC configuration operations 508 that may operate to configure the multi-endpoint adapter device 312 in a manner that prevents the use of the processor interconnect 310 for data packets transmitted between the endpoint devices 324a/324b and the applications 600/602. For example, as discussed in U.S. patent Ser. No. 15/872,100, filed on Jan. 16, 2018, when the respective connections 328 and 330 are provided for each of the processing subsystems 306a and 308a, respectively, to the multi-endpoint adapter device 312 (e.g., via the PHY device 326), it is desirable to configure the multi-endpoint adapter device 312 to prevent the use of the processor interconnect 310 for data packets transmitted between the endpoint devices 324a/324b and the applications 600/602. As such, the NIC configuration operations 508 may operate to configure the multi-endpoint adapter device 312 to ensure that data packet transmissions between the endpoint devices 324a/324b and the processing subsystem 306a/308a occur over the connections 328 and 330 and not the processor interconnect 310, which may include reconfiguring a ×16 connection between the processing subsystem 306a and the endpoint device 324a (e.g., that is utilized when the connection 330 is not available) into two ×8 connections between the processing subsystems 306a and 308 and each of the endpoints 324a and 324b, respectively, (e.g., using the available connections 328 and 330, respectively) that are mapped to root ports (e.g., PCIe root ports) on their respective processing subsystems 306a and 308a.

In another example, at block 404 and as illustrated in FIG. 5, the MC controller 318 may utilize the data packet routing configuration information to provide a flow information update 510 to the internal switch device 320 that may include data flow match information that, as discussed below, is configured to allow for the matching of data packets to data flows that are associated with particular applications (e.g., the applications 600 and 602 illustrated in FIGS. 6A-60 and 7A-7C). Furthermore, the flow information update 510 may also include data flow action information that, as discussed below, is configured to provide for the performance of data flow actions on data packets that match data flows that are associated with particular applications (e.g., the applications 600 and 602 illustrated in FIGS. 6A-6C and 7A-7C). As would be understood by one of skill in the art in possession of the present disclosure, the provisioning of the flow information update 510 may include the programming of rules in the internal switch device 320 that identify application data packet flows, provide for actions on data packets in data packet flows, and/or provide for any other SDN programming operations that would be apparent to one of skill in the art in possession of the present disclosure. As such, in some embodiments, the provisioning of the data flow match information and/or data flow action information to the internal switch device 320 may include storing that data flow match information and/or data flow action information in an internal switch device database included in the internal switch device 320 and/or otherwise accessible to the internal switch device.

In another example, at block 404 and as illustrated in FIG. 5, the NIC controller 318 may utilize the data packet routing configuration information to provide a flow database update 512 to the internal switch device 320 that may include updating a flow database table included in the internal switch device 320 and/or otherwise accessible to the internal switch device. As will be understood by one of skill in the art in possession of the present disclosure, the flow database table may provide for Internet Protocol (IP)/MAC forwarding, and its updating at block 404 may ensure that data packets are forwarded to a desired MAC port, which may provide for the splitting of data traffic received the multi-endpoint adapter device ports 314a and 314b between MAC ports that are mapped to particular endpoint devices 324a and 324b, as well as a variety of other functionality known in the art.

Furthermore, in some embodiments, the internal switch device 320 may perform other configuration operations as well. For example, at block 404, the internal switch device 320 may operate to configure the MAC controllers 322a and 322b by, for example, providing for the configuration of link speed settings, Link Layer Discovery Protocol (LLDP) Type-Length-Value (TLV) based configuration of MAC controllers (e.g., the internal switch device 320 may utilize LLDP TLVs to negotiate the configuration of the MAC controllers), and/or other configuration operations that would be apparent to one of skill in the art in possession of the present disclosure.

In another example, at block 404, the internal switch device 320 may provide for negotiations between the multi-endpoint adapter device port 314a and/or transceiver 316a and the external switch device port 300a on the external switch device 300 in order to configure the multi-endpoint adapter device port 314a and/or transceiver 316a to provide a 25 Gbps data transmission speed with the external switch device port 300a. In another example, the internal switch device 320 may provide for negotiations between the multi-endpoint adapter device port 314b and/or transceiver 316b with the external switch device port 300b on the external switch device 300 in order to configure the multi-endpoint adapter device port 314b and/or transceiver 316b to provide a 10 Gbps data transmission speed with the external switch device port 300b. In yet another example, the internal switch device 320 may perform bonding, teaming, trunking, and/or other aggregation techniques on the multi-endpoint adapter device port 314a/transceiver 316a and the multi-endpoint adapter device port 314b/transceiver 316b in order to provide an aggregated link between the multi-endpoint adapter device 312 and the external switch device 300 (which, as discussed below, may provide a 10+25 Gpbs data transmission speed using the examples above).

While a few specific examples of the configuration of the internal switch device 320 and other subsystems in the multi-endpoint adapter device 312 have been described, one of skill in the art in possession of the present disclosure will recognize that a variety of configurations may be performed on the multi-endpoint adapter device 312 at block 404 in order to provide for the functionality discussed below while remaining within the scope of the present disclosure as well.

Figure 7A:
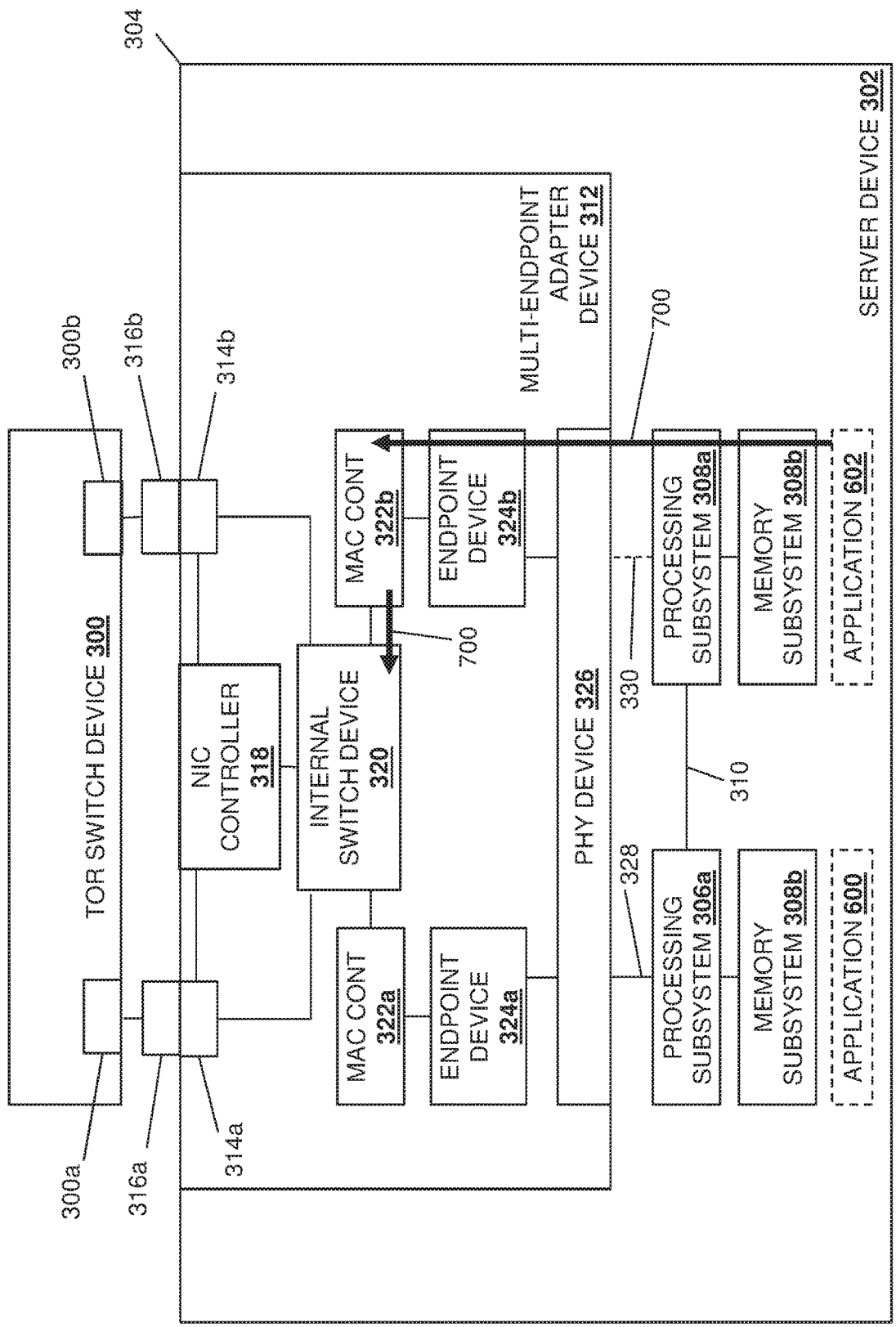
FIG. 7A is a schematic view illustrating an embodiment of the data packet routing operations of the multi-endpoint adapter/multi-processor system in the server device of FIG. 3 during the method of FIG. 4.
Figure 7B:
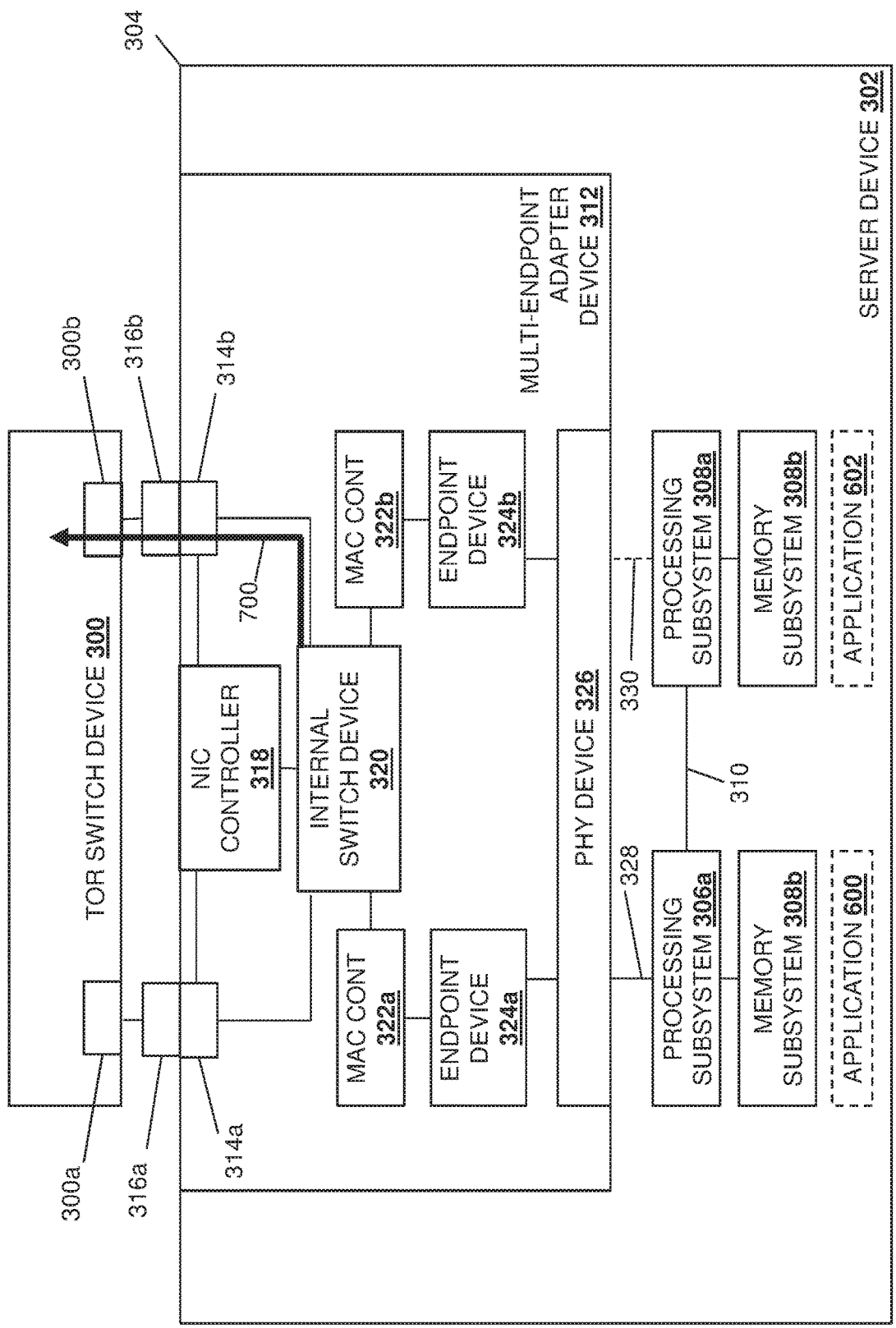
FIG. 7B is a schematic view illustrating an embodiment of the data packet routing operations of the multi-endpoint adapter/multi-processor system provided by the switch device and the server device of FIG. 3 during the method of FIG. 4.
Figure 7C:
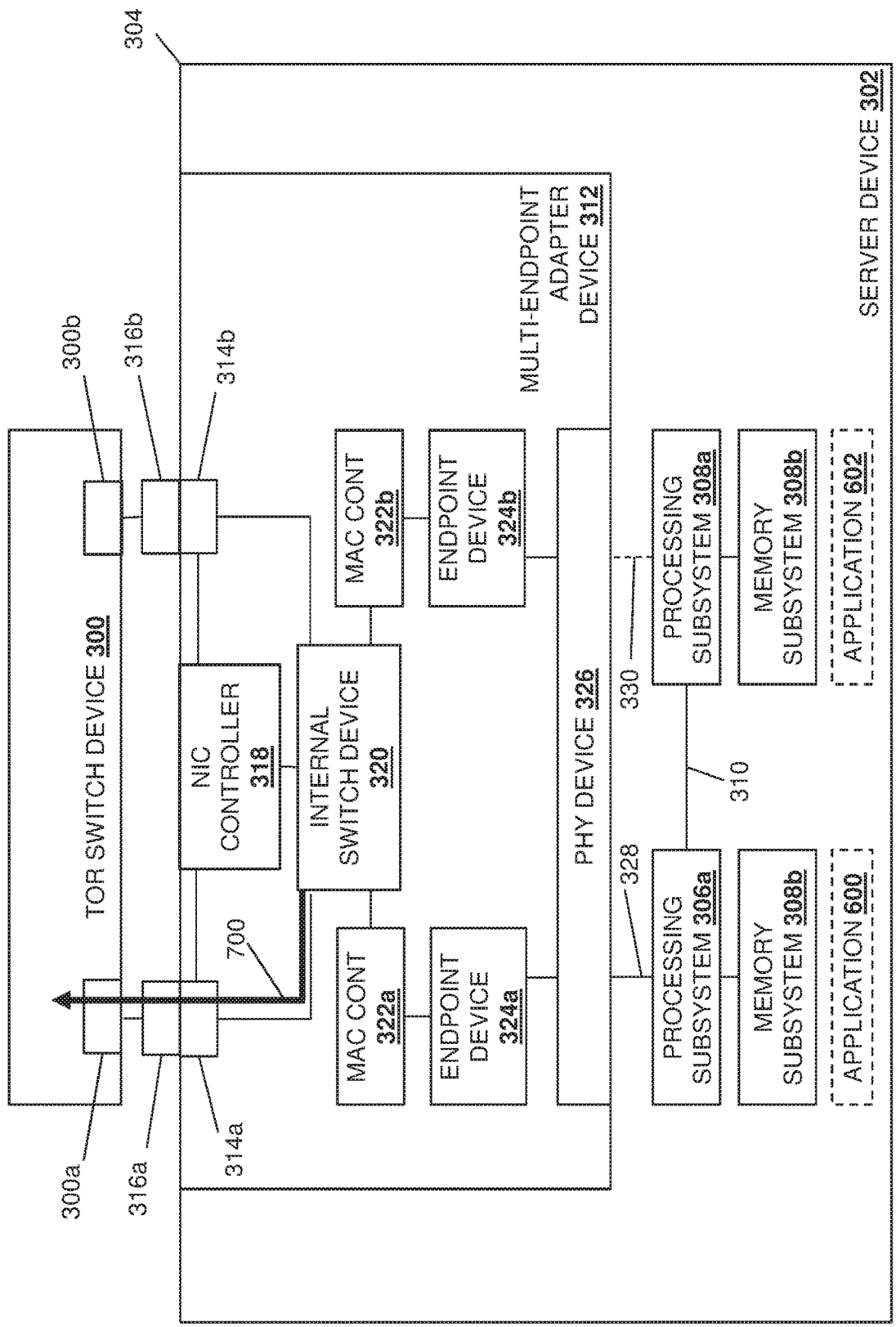
FIG. 7C is a schematic view illustrating an embodiment of the data packet routing operations of the multi-endpoint adapter/multi-processor system provided by the switch device and the server device of FIG. 3 during the method of FIG. 4.

The method then proceeds to block 406 where the internal switch device receives a data packet from an application and matches the data packet to a data flow. In an embodiment, at block 406 and as illustrated in FIG. 7A, the application 602 may operate to generate a data packet 700 and transmit that data packet 700. As discussed above, the application 602 and multi-endpoint adapter device 312 may be configured to prevent the applications 600 and 602 from providing data packets via the processor interconnect 310 and, as such, the data packet 700 generated by the application 602 is transmitted by the processing subsystem 308a to the PHY device 326 via the connection 330 such that it is received by the endpoint device 324b, which provides the data packet 700 through the MAC controller 322b to the internal switch device 320. While not illustrated or discussed in detail, one of skill in the art in possession of the present disclosure will recognize that the application 600 may transmit data packets in a similar manner such that those data packets are transmitted by the processing subsystem 306a to the PHY device 326 via the connection 328 and received by the endpoint device 324a, which then provides those data packets through the MAC controller 322a to the internal switch device 320.

In an embodiment, at block 406 and upon receiving the data packet 700, the internal switch device 320 may operate to compare information included in the data packet 700 with the data packet flow information that was provided to the internal switch device 320 (e.g., in the internal switch device database as discussed above) at block 404, and identify a data flow in the data packet flow information that matches the data packet that was received at block 406. As would be understood by one of skill in the art in possession of the present disclosure, a data flow may be made up of a plurality of data packets, and common information may be included in each of those data packets that belong to the same data flow, which allows the inspection of any particular data packet in order to match its data packet information to a data flow (i.e., when that data flow is identified as discussed above via the data packet flow information.) In a specific example, an application generating the data packet received at block 406 may provide a variety of data packet information in that data packet that allows for the matching of that data packet to a data flow including, for example, a MAC address of the source/destination peers, a VLAN tag that identifies the network resource group to which the QoS policy will be applied, a bandwidth setting that provides for settings such as maximum available/minimum available/ best effort/minimum guarantee, an IP address of the source/ destination peers, a port number of the workload server, and/or any other data packet information that would be apparent to one of skill in the art in possession of the present disclosure. As such, continuing with the example provided above, the internal switch device 320 may determine that the data packet 700 received at block 406 matches a data flow that is provided by the application 602 by, for example, determining that the data packet 700 includes a VLAN tag that matches a VLAN tag for data flows provided by the application 602.

The method then proceeds to block 408 where the internal switch device identifies a data flow action associated with the data flow. In an embodiment, at block 408 and upon identifying the data flow to which the data packet 700 belongs, the internal switch device 320 may operate to access the data flow action information that was provided to the internal switch device 320 (e.g., in the internal switch device database as discussed above) at block 404, and identify at least one data flow action associated with that data flow. As discussed above and for the purposes of the examples below, the multi-endpoint adapter device port 314a and/or transceiver 316a may have been configured to provide a 25 Gbps data transmission speed with the external switch device port 300a on the external switch device 300, while the multi-endpoint adapter device port 314b and/or transceiver 316b may have been configured to provide a 10 Gbps data transmission speed with the external switch device port 300b on the external switch device 300. Furthermore, in some examples, the multi-endpoint adapter device port 314a/transceiver 316a and the multi-endpoint adapter device port 31412/transceiver 316b may have been aggregated via bonding, teaming, trunking, and/or other aggregation techniques that would be apparent to one of skill in the art in possession of the present disclosure.

In an example of block 408, the data flow action identified at block 408 may provide for the transmittal of data packets that are part of that data flow via the multi-endpoint adapter device port 314b because, for example, the data flow is provided from the application 602 that is associated with QoS parameters that require a minimum 10 Gbps data packet transmission speed for data packets that are part of its data flow(s). In another example of block 408, the data flow action identified at block 408 may provide for the transmittal of data packets that are part of that data flow via the multi-endpoint adapter device port 314a because, for example, the data flow is provided from the application 602 that is associated with QoS parameters that require a minimum 25 Gbps data packet transmission speed for data packets that are part of its data flow(s). In yet another example, the data flow action identified at block 408 may provide for the transmittal of data packets that are part of that data flow via the aggregated multi-endpoint adapter device ports 314a and 314b because, for example, the data flow is provided from the application 602 that is associated with QoS parameters that require a minimum 35 Gbps data packet transmission speed for data packets that are part of its data flow(s). While the examples provided herein are directed to data flow actions that transmit data packets that match a data flow at particular minimum data packet transmission speeds, as discussed below other data flow actions may be provided for data packets that are part of a data flow (e.g., transmission of those data packets at a maximum latency, or even non-data-packet transmission actions in some embodiments) while remaining within the scope of the present disclosure.

Figure 7D:
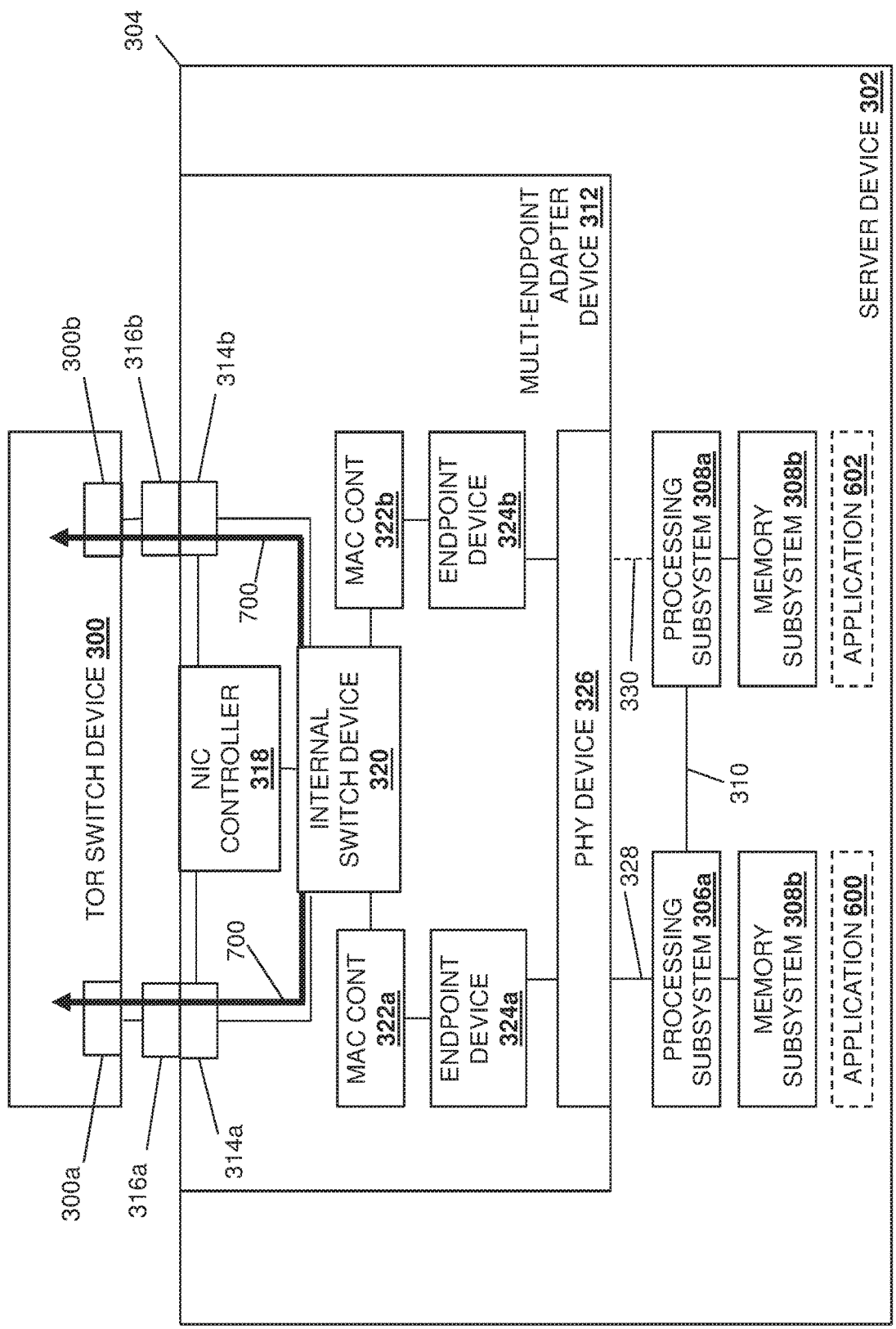
FIG. 7D is a schematic view illustrating an embodiment of the data packet routing operations of the multi-endpoint adapter/multi-processor system provided by the switch device and the server device of FIG. 3 during the method of FIG. 4.

The method 400 then proceeds to block 410 where the internal switch device performs the data flow action on the data packet. In an embodiment, at block 406, the internal switch device 320 operates to transmit the data packet 700 received at block 406 according to the data flow action determined at block 408. Continuing with the examples above, and with reference to FIG. 7B, the internal switch device 320 may perform the data flow action identified at block 408 to transmit the data packet 700 via the multi-endpoint adapter device port 314b because, as discussed above, the data packet was received from the application 602 that is associated with QoS parameters that require a minimum 10 Gbps data packet transmission speed for data packets that are part of its data flow(s), and the multi-endpoint adapter device port 314b has been configured to provide 10 Gbps data transmission speeds. Similarly, and with reference to FIG. 7C, the internal switch device 320 may perform the data flow action identified at block 408 to transmit the data packet 700 via the multi-endpoint adapter device port 314a because, as discussed above, the data packet was received from the application 602 that is associated with QoS parameters that require a minimum 25 Gbps data packet transmission speed for data packets that are part of its data flow(s), and the multi-endpoint adapter device port 314a has been configured to provide 25 Gbps data transmission speeds With reference to FIG. 7D, the internal switch device 320 may perform the data flow action identified at block 408 to transmit the data packet 700 via either of the aggregated multi-endpoint adapter device ports 314a and 314b because, as discussed above, the data flow was received from the application 602 that is associated with QoS parameters that require a minimum 30 Gbps data packet transmission speed for data packets that are part of its data flow(s), and the multi-endpoint adapter device ports 314a and 314b has been configured (e.g., aggregated) to provide 10+25 Gbps data transmission speeds.

While examples for the transmission of data packets generated by the application 602 have been provided, one of skill in the art in possession of the present disclosure will recognize that data packets transmitted by the application 600 may be transmitted in a similar manner as well. Furthermore, one of skill in the art in possession of the present disclosure will recognize how data flows from each of the applications 600 and 602 may be handled by the internal switch device 320 to ensure QoS guarantees are satisfied for both by, for example, preventing "noisy neighbor" problems in which one of those application would otherwise utilize data transmission bandwidth that is not called for according to its QoS parameters (e.g., with the internal switch device 320 preventing that from occurring with knowledge that the other application requires that bandwidth based on its QoS parameters.) Similarly, one of skill in the art in possession of the present disclosure will recognize how power savings and external switch device processing/frequency/load resource use efficiencies may be realized with the teachings of the present disclosure, as the internal switch device 320 is may be configured to ensure that applications only utilize the data packet transmission bandwidth that is required by their QoS guarantees. Furthermore, the QoS configurations provided as discussed above may be persistent with the socket direct domain requirements for the applications, irrespective of changes in the external network topology and/or unchanged external network wiring.

Thus, systems and methods have been described that provide for the configuration of a multi-endpoint adapter device to provide for the transmission of data packets via the multi-endpoint adapter device in a manner that ensures a Quality of Service (QoS) guaranteed to an application that provided those data packets. As such, an internal switch device on the multi-endpoint adapter device may be configured such that the internal switch device receives data packets from applications and uses data flow matching information to match those data packets to particular data flows, while using data flow action information to determine data flow actions that are associated with those data flows and that provide for the transmission of their associated data packets in a manner that satisfies the QoS guarantees for the applications that generated them. The internal switch device may then transmit each data packet it received according to the data flow action identified for the data flow that matches that data packet, which ensures that each data packet generated by an application will be transmitted to an external switch device via the multi-endpoint adapter device ports on the multi-endpoint adapter device that are configured to satisfy the QoS guarantee associated with that data packet. As such, the teachings of the present disclosure provide data packet transmission systems that may save power by ensuring that data packets are not transmitted at higher speeds than are required, conserve external switch device processing, frequency, and, load resources, work around "noisy neighbor" applications that attempt to utilize transmission resources they do not require, and/or provide a variety of other benefits that would be apparent to one of skill in the art in possession of the present disclosure.

Furthermore, the present disclosure is being filed along with U.S. patent application Ser. No. 16/396,022, filed on Apr. 26, 2019, and directed to virtual machine deployment techniques; U.S. patent application Ser. No. 16/396,200, filed on Apr. 26, 2019, and directed to data splitting techniques; U.S. patent application Ser. No. 16/396,320, filed on Apr. 26, 2019, and directed to data duplicating techniques; U.S. patent application Ser. No. 16/395,468, filed on Apr. 26, 2019, and directed to communication coupling configuration techniques; U.S. patent application Ser. No. 16/396,521, filed on Apr. 26, 2019, and directed to connection configuration techniques; and U.S. patent application Ser. No. 16/395,584, filed on Apr. 26, 2019, and directed to sideband communication techniques; each of which include embodiments that utilize the multi-processor/multi-endpoint systems described in some of the embodiments included in the present disclosure. One of skill in the art in possession of the present disclosure will recognize how embodiments of the present disclosure may be combined with some or all of the disclosures discussed above, and thus those disclosures are incorporated by reference herein in their entirety.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-endpoint adapter device, comprising:
   a plurality of endpoint devices that are each configured to couple to a respective processing subsystem that is included in a plurality of processing subsystems that are included in a processing system, wherein each of the respective processing subsystems are coupled together by a processor interconnect;
   a plurality of multi-endpoint adapter device ports that are each configured to couple to respective external switch device ports on an external switch device; and
   an internal switch device that is coupled to each of the plurality of endpoint devices and each of the plurality of multi-endpoint adapter device ports, wherein the internal switch device is configured to:
      receive, from a first application that is provided by a first processing subsystem included in the plurality of processing subsystems and through a first endpoint device included in the plurality of endpoint devices, a data packet, wherein the first endpoint device and the first processing subsystem are configured to communicate using data packet routing configuration information that prevents use of the processor interconnect when transmitting the data packet from the first processing subsystem to the first endpoint device;
      match the data packet to a data flow that is identified in an internal switch device database and that is associated with at least one Quality of Service (QoS) parameter;
      identify a data flow action that is associated with the data flow in the internal switch device database and that provides for transmission of the data packet via a first multi-endpoint adapter device port that is included in the plurality of multi-endpoint adapter device ports and that is configured in a manner that satisfies the at least one QoS parameter; and
      perform the data flow action to transmit the data packet through the first multi-endpoint adapter device port to the external switch device.

2. The multi-endpoint adapter device of claim 1, further comprising:
   a controller that is coupled to at least one of the plurality of multi-endpoint adapter device ports, wherein the controller is configured to:
      receive, via at least one of the plurality of multi-endpoint adapter device ports and via the external switch device, data flow match information; and
      store the data flow match information in the internal switch device database, wherein the internal switch device is configured to use the data flow match information to match the data packet to the data flow.

3. The multi-endpoint adapter device of claim 1, further comprising:
   a controller that is coupled to at least one of the plurality of multi-endpoint adapter device ports, wherein the controller is configured to:
      receive, via at least one of the plurality of multi-endpoint adapter device ports and via the external switch device, data flow action information; and
      store the data flow action information in the internal switch device database, wherein the internal switch device is configured to identify the data flow action from the data flow action information.

4. The multi-endpoint adapter device of claim 1, wherein the internal switch device is configured to:

provide for a negotiation between the first multi-endpoint adapter device port and a first external switch device port that configures the first multi-endpoint adapter device port the manner that satisfies the at least one QoS parameter.

5. The multi-endpoint adapter device of claim 1, wherein the matching the data packet to the data flow that is identified in the internal switch device database includes:
identifying a Virtual Local Area Network (VLAN) tag that was provided in the data packet by the first application; and
matching the VLAN tag to a VLAN tag that is associated with the data flow in the internal switch device database.

6. The multi-endpoint adapter device of claim 1, wherein the at least one QoS parameter includes a minimum transmission speed.

7. An Information Handling System (IHS), comprising:
a plurality of memory subsystems;
a respective processing subsystem coupled to each of the plurality of memory subsystems, wherein each respective processing subsystem is configured to execute instructions that are included on a respective memory subsystem of the plurality of memory subsystems to which it is coupled in order to provide a respective application, and wherein each of the respective processing subsystems are coupled together by a respective processor interconnect; and
a multi-endpoint adapter device that is coupled to each of the respective processing subsystems, wherein the multi-endpoint adapter device includes:
a respective endpoint device coupled to each respective processing subsystem;
a plurality of multi-endpoint adapter device ports that are coupled to respective external switch device ports on an external switch device; and
an internal switch device that is coupled to each of the respective endpoint devices and each of the plurality of multi-endpoint adapter device ports, wherein the internal switch device is configured to:
receive, from a first application provided by a first processing subsystem and through a first endpoint device, a data packet, wherein the first endpoint device and the first processing subsystem are configured to communicate using data packet routing configuration information that prevents use of the respective processor interconnect when transmitting the data packet from the first processing subsystem to the first endpoint device;
match the data packet to a data flow that is identified in an internal switch device database and that is associated with at least one Quality of Service (QoS) parameter;
identify a data flow action that is associated with the data flow in the internal switch device database and that provides for transmission of the data packet via a first multi-endpoint adapter device port that is included in the plurality of multi-endpoint adapter device ports and that is configured in a manner that satisfies the at least one QoS parameter; and
perform the data flow action to transmit the data packet through the first multi-endpoint adapter device port to the external switch device.

8. The IHS of claim 7, wherein the multi-endpoint adapter device includes:

a controller that is coupled to at least one of the plurality of multi-endpoint adapter device ports, wherein the controller is configured to:
receive, via at least one of the plurality of multi-endpoint adapter device ports and via the external switch device, data flow match information; and
store the data flow match information in the internal switch device database, wherein the internal switch device is configured to use the data flow match information to match the data packet to the data flow.

9. The IHS of claim 7, wherein the multi-endpoint adapter device includes:
a controller that is coupled to at least one of the plurality of multi-endpoint adapter device ports, wherein the controller is configured to:
receive, via at least one of the plurality of multi-endpoint adapter device ports and via the external switch device, data flow action information; and
store the data flow action information in the internal switch device database, wherein the internal switch device is configured to identify the data flow action from the data flow action information.

10. The IHS of claim 7, wherein the internal switch device is configured to:
provide for a negotiation between the first multi-endpoint adapter device port and a first external switch device port that configures the first multi-endpoint adapter device port the manner that satisfies the at least one QoS parameter.

11. The IHS of claim 7, wherein the matching the data packet to the data flow that is identified in the internal switch device database includes:
identifying a Virtual Local Area Network (VLAN) tag that was provided in the data packet by the first application; and
matching the VLAN tag to a VLAN tag that is associated with the data flow in the internal switch device database.

12. The IHS of claim 7, wherein the at least one QoS parameter includes a minimum transmission speed.

13. The IHS of claim 7, wherein the at least one QoS parameter includes a maximum latency.

14. A method for routing packets in a multi-endpoint adapter/multi-processor system, comprising:
receiving, by an internal switch device included in a multi-endpoint adapter device from a first application of a plurality of applications that are each provided by a respective one of a plurality of processing subsystems that are each coupled to the multi-endpoint adapter device via a respective multi-endpoint adapter device port on a multi-endpoint adapter and through one of a plurality of endpoint devices that are included on the multi-endpoint adapter device, a data packet,
wherein each of the plurality of processing subsystems are coupled together by a respective processor interconnect, and
wherein the respective one of the plurality of processing subsystems and the one of the plurality of endpoint devices are configured to communicate using data packet routing configuration information that prevents use of the respective processor interconnect when transmitting the data packet from the respective one of the plurality of processing subsystems to the one of the plurality of endpoint devices;
matching, by the internal switch device, the data packet to a data flow that is identified in an internal switch device database and that is associated with at least one Quality of Service (QoS) parameter;

identifying, by the internal switch device, a data flow action that is associated with the data flow in the internal switch device database and that provides for transmission of the data packet via a first multi-endpoint adapter device port and that is configured in a manner that satisfies the at least one QoS parameter; and performing, by the internal switch device, the data flow action to transmit the data packet through the first multi-endpoint adapter device port to the external switch device.

15. The method of claim 14, further comprising:

receiving, by a controller that is included in the multi-endpoint adapter device via the external switch device and through at least one of the respective multi-endpoint adapter device ports to which it is coupled, data flow match information; and storing, by the controller, the data flow match information in the internal switch device database, wherein the internal switch device is configured to use the data flow match information to match the data packet to the data flow.

16. The method of claim 14, further comprising:

receiving, by a controller that is included in the multi-endpoint adapter device via the external switch device and through at least one of the respective multi-endpoint adapter device ports to which it is coupled, data flow action information; and storing, by the controller, the data flow action information in the internal switch device database, wherein the internal switch device is configured to identify the data flow action from the data flow action information.

17. The method of claim 14, further comprising:

providing, by the internal switch device, for a negotiation between the first multi-endpoint adapter device port and a first external switch device port that configures the first multi-endpoint adapter device port the manner that satisfies the at least one QoS parameter.

18. The method of claim 14, wherein the matching the data packet to the data flow that is identified in the internal switch device database includes:

identifying a Virtual Local Area Network (VLAN) tag that was provided in the data packet by the first application; and matching the VLAN tag to a VLAN tag that is associated with the data flow in the internal switch device database.

19. The method of claim 14, wherein the at least one QoS parameter includes a minimum transmission speed.

20. The method of claim 14, wherein the at least one QoS parameter includes a maximum latency.

* * * * *